United States Patent
Rexha et al.

(10) Patent No.: US 10,128,751 B1
(45) Date of Patent: Nov. 13, 2018

(54) CONTROL SYSTEM FOR CONTROLLING A DC-DC VOLTAGE CONVERTER CIRCUIT

(71) Applicant: LG Chem, Ltd., Seoul (KR)

(72) Inventors: Mehdi Rexha, Sterling Heights, MI (US); Chieh-Kai Chang, Grosse Pointe Woods, MI (US)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/879,970

(22) Filed: Jan. 25, 2018

Related U.S. Application Data (60) Provisional application No. 62/504,147, filed on May 10, 2017.

(51) Int. Cl.
*H02M 3/156* (2006.01)
*H02M 1/00* (2006.01)

(52) U.S. Cl.
CPC .... *H02M 3/156* (2013.01); *H02M 2001/0022* (2013.01)

(58) Field of Classification Search
CPC .... H02M 3/156–3/158; H02M 3/1584; H02M 3/1588; G05F 3/06; H01F 2029/143; H01F 29/14
USPC .......................................................... 363/75
See application file for complete search history.

(56) References Cited

U.S. PATENT DOCUMENTS

| | | | |
|---|---|---|---|
| 9,106,183 B2 | 8/2015 | Liu et al. | |
| 9,136,795 B2 | 9/2015 | Liu et al. | |
| 9,473,073 B2 | 10/2016 | Liu et al. | |
| 9,543,826 B2* | 1/2017 | Chen | H02M 1/44 |
| 2015/0326102 A1 | 11/2015 | Radhakrishnan et al. | |
| 2016/0254689 A1 | 9/2016 | Lee et al. | |
| 2017/0363691 A1* | 12/2017 | Katrak | G01R 19/165 |
| 2017/0363692 A1* | 12/2017 | Katrak | G01R 31/40 |
| 2017/0365996 A1* | 12/2017 | Katrak | G01R 19/16519 |

FOREIGN PATENT DOCUMENTS

| | | |
|---|---|---|
| JP | 2010148192 A | 7/2010 |
| KR | 1417669 B | 7/2014 |
| KR | 20150049061 A | 5/2015 |
| KR | 20160105606 A | 9/2016 |

* cited by examiner

*Primary Examiner* — Yemane Mehari
(74) *Attorney, Agent, or Firm* — Buckert Patent & Trademark Law Firm PC; John F. Buckert (57) ABSTRACT

A control system for controlling a DC-DC voltage converter circuit is provided. An output voltage controller outputs a DC-DC voltage converter control voltage to an input control terminal to increase a switching duty cycle within the DC-DC voltage converter circuit when the low voltage is less than an output reference voltage. An input voltage controller reduces the DC-DC voltage converter control voltage at the input control terminal of the DC-DC voltage converter circuit when a high voltage is less than an input reference voltage to reduce the switching duty cycle within the DC-DC voltage converter circuit.

13 Claims, 9 Drawing Sheets

CONTROL SYSTEM FOR CONTROLLING A DC-DC VOLTAGE CONVERTER CIRCUIT

CROSS-REFERENCE TO RELATED APPLICATION

This application claims priority to U.S. Provisional Patent Application No. 62/504,147 filed on May 10, 2017, the entire contents of which are hereby incorporated by reference herein.

BACKGROUND

The inventors herein have recognized a need for an improved control system for controlling a DC-DC voltage converter circuit that maintains an output voltage below a maximum desired output voltage level, and maintains an output current below a maximum desired current level, and maintains an input voltage below a maximum desired input voltage level.

SUMMARY

A control system for controlling a DC-DC voltage converter circuit in accordance with an exemplary embodiment is provided. The DC-DC voltage converter circuit has a high voltage terminal, a low voltage terminal, an input control terminal. The high voltage terminal is electrically coupled to a high voltage source. The low voltage terminal is electrically coupled to a low voltage source. The control system includes an output voltage controller that is electrically coupled to the low voltage terminal and to the input control terminal of the DC-DC voltage converter circuit. The output voltage controller receives a low voltage from the low voltage source. The output voltage controller outputs a DC-DC voltage converter control voltage to the input control terminal to increase a switching duty cycle within the DC-DC voltage converter circuit when the low voltage is less than an output reference voltage. The control system further includes a first diode having a first cathode and a first anode. The first anode is electrically coupled to the input control terminal of the DC-DC voltage converter circuit. The control system further includes an input voltage controller that is electrically coupled to the high voltage terminal of the DC-DC voltage converter circuit and receives a high voltage from the high voltage source. The input voltage controller further receives an input reference voltage. The input voltage controller is further electrically coupled to the first cathode of the first diode. The input voltage controller reduces the DC-DC voltage converter control voltage at the input control terminal of the DC-DC voltage converter circuit when the high voltage is less than the input reference voltage to reduce the switching duty cycle within the DC-DC voltage converter circuit.

DETAILED DESCRIPTION

Figure 1:
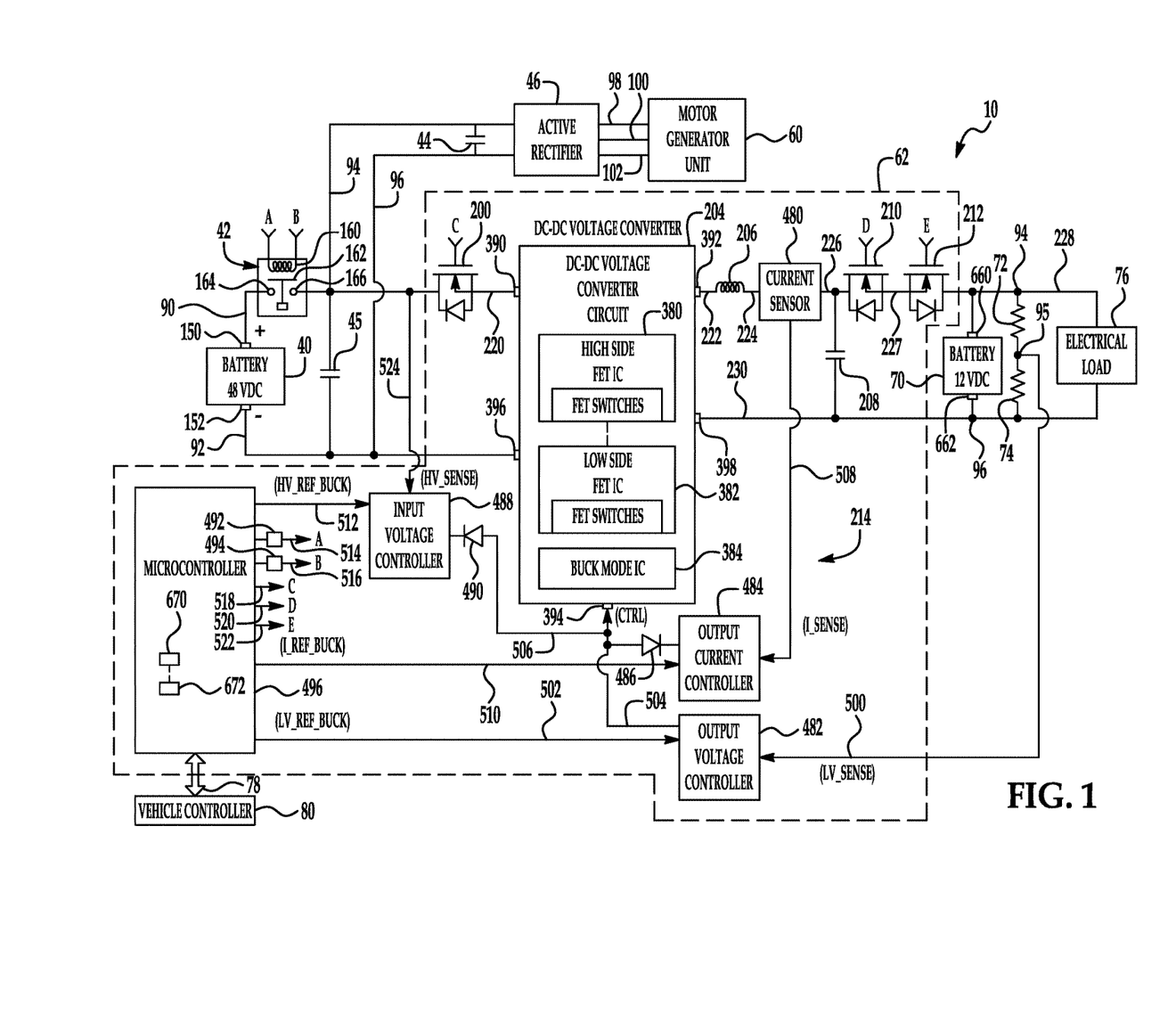
FIG. 1 is a schematic of a vehicle having a control system for a DC-DC voltage converter circuit in accordance with an exemplary embodiment.

Referring to FIG. 1, a vehicle 10 is provided. The vehicle 10 includes a battery 40, a contactor 42, capacitors 44, 45, an active rectifier 46, a motor generator unit 60, a DC-DC voltage regulator 62, a battery 70, resistors 72, 74, an electrical load 76, a communication bus 78, a vehicle controller 80, and electrical lines 90, 92, 94, 96, 98, 100, 102. An advantage of the DC-DC voltage regulator 62 is that DC-DC voltage regulator 62 has a control system 214 that utilizes an output voltage controller 482 to maintain an output voltage below a maximum desired output voltage level, and an output current controller 484 to maintain an output current below a maximum desired current level, and an input voltage controller 488 to maintain an input voltage below a maximum desired input voltage level.

For purposes of understanding, a few terms utilized herein will be explained.

A node, an electrical node, or an electrical terminal can be used interchangeably herein and is a region or a location in an electrical circuit.

A signal is electrical voltage or an electrical current.

A low voltage source is a voltage source that outputs a voltage level less than a voltage level output by a high voltage source. For example, in an exemplary embodiment, the battery 70 outputs 12 Vdc, and a resistor network electrically coupled in parallel to the battery 70 outputs a voltage proportional to the 12 Vdc and is considered a low voltage source.

A high voltage source is a voltage source that outputs a voltage level greater than a voltage level output by the low voltage source. For example, in an exemplary embodiment, the battery 40 which outputs 48 Vdc is a high voltage source.

Figure 2:
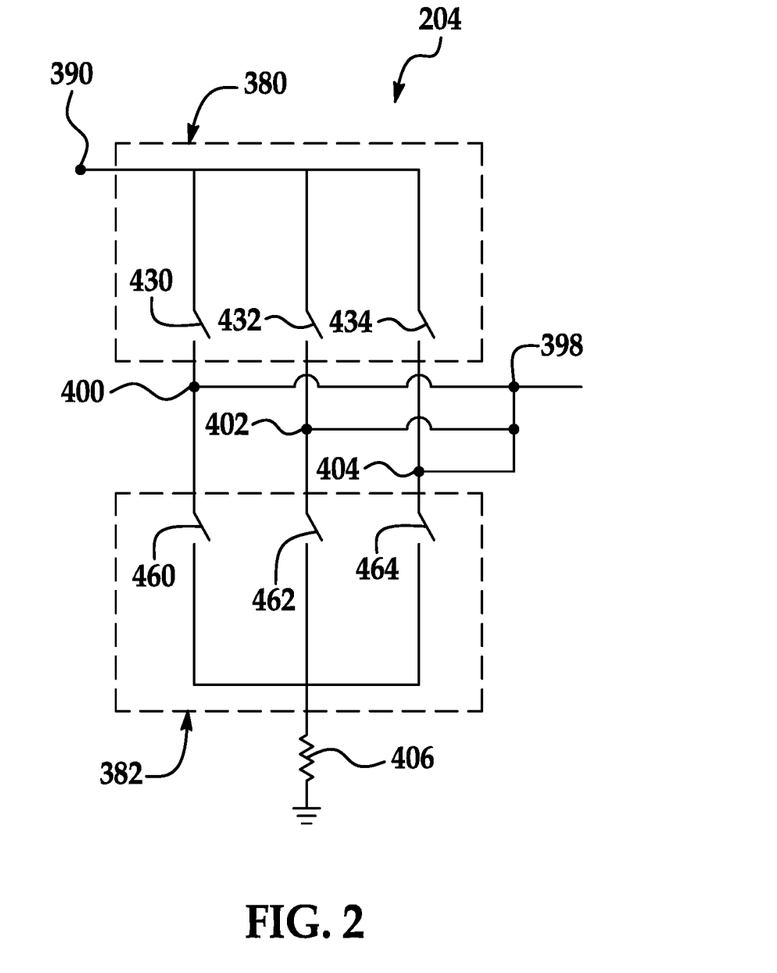
FIG. 2 is a circuit schematic of a portion of the DC-DC voltage converter circuit of FIG. 1.

A buck operational mode is an operational mode of the DC-DC voltage converter 62 in which the DC-DC voltage converter 62 applies a voltage to the battery 70. In an exemplary embodiment, when the DC-DC voltage converter 62 has the buck operational mode, the contactor 42 has a closed operational state, the high voltage FET switch 200 has a closed operational state, the FET switches within the high side FET IC 380 and the low side DET IC 382 are being switched as desired, and the low voltage FET switches 210, 212 each have a closed operational state.

Figure 3:
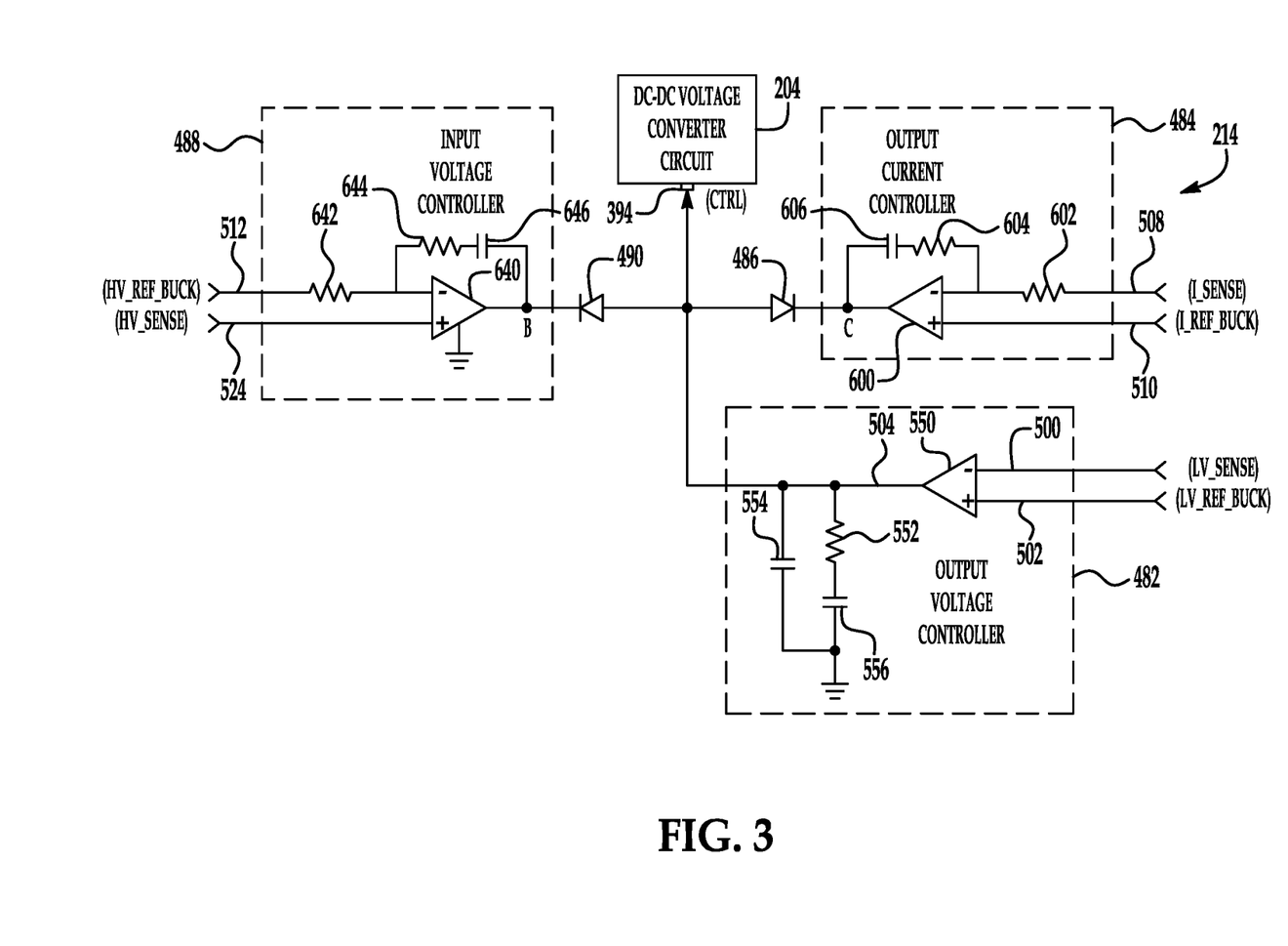
FIG. 3 is a circuit schematic of a portion of the control system of FIG. 1 having an output voltage controller, an output current controller, and an input voltage controller.

An output voltage control mode is an operational mode of the DC-DC voltage converter 62 during the buck operational mode in which the output voltage controller 484 maintains an output voltage of the DC-DC voltage converter circuit 204 below a maximum desired output voltage level.

An output current control mode is an operational mode of the DC-DC voltage converter 62 during the buck operational mode in which the output current controller 484 maintain an output current of the DC-DC voltage converter circuit 204 below a maximum desired current level.

An input voltage control mode is an operational mode of the DC-DC voltage converter 62 during the buck operational mode in which the input voltage controller 488 maintains an input voltage to the DC-DC voltage converter circuit 204 below a maximum desired input voltage level.

A FET is a field effect transistor, and an IC is an integrated circuit.

The vehicle 10 will now be explained.

The battery 40 includes a positive terminal 150 and a negative terminal 152. In an exemplary embodiment, the battery 40 generates 48 Vdc between the positive terminal 150 and the negative terminal 152. The positive terminal 150 is electrically coupled to a first electrical node 164 on a first side of the contactor 42. The negative terminal 152 is electrically coupled to an electrical ground.

The contactor 42 has a contactor coil 160, a contact 162, a first electrical node 164 and a second electrical node 166. The first electrical node 164 is electrically coupled to the positive terminal 150 of the battery 40. The second electrical node 166 is electrically coupled to both the active rectifier 46 and the high voltage FET switch 200. When the microcontroller 496 generates first and second control signals that are received by the voltage drivers 492, 494, respectively, the contactor coil 160 is energized which transitions the contact 162 to a closed operational state. Alternately, when the microcontroller 496 generates third and fourth control signals that are received by the voltage drivers 492, 494, respectively, the contactor coil 160 is de-energized which transitions the contact 162 to an open operational state. In an exemplary embodiment, the third and fourth control signals can each be a ground voltage level.

The active rectifier 46 is utilized to store and release electrical energy from the motor generator unit 60, the battery 40, and the DC-DC voltage converter 62. The active rectifier 46 is electrically coupled to the electrical node 166 of the contactor 42 via the electrical line 94. The active rectifier 46 is electrically coupled to the negative terminal 152 of the battery 40 utilizing the electrical line 96. The active rectifier 46 is further electrically coupled to the motor generator unit 60 utilizing the electrical lines 98, 100, 102. The capacitor 44 is electrically coupled to and between electrical lines 94, 96.

The motor generator unit 60 is provided to generate an AC voltage that is received by the active rectifier 46 via the electrical lines 98, 100, 102. The active rectifier 46 output a DC voltage between the electrical lines 94, 96 in response to receiving the AC voltage from the motor generator unit 60.

The DC-DC voltage converter 62 includes a high voltage FET switch 200, a DC-DC voltage converter circuit 204, an inductor 206, a capacitor 208, low voltage FET switches 210, 212, a control system 214, and electrical lines 220, 222, 224, 226, 227, 228, 230.

The high voltage FET switch 200 is electrically coupled to and between the node 166 of the contactor 42 and the high voltage terminal 390 of the DC-DC voltage converter circuit 204. When the microcontroller 496 generates a first control signal that is received by the high voltage FET switch 200, the high voltage FET switch 200 transitions to a closed operational state and electrically couples the node 166 to the high voltage terminal 390 of the DC-DC voltage converter circuit 204. Thereafter, a voltage from either the active rectifier 46 (or the battery 40 if the contactor 40 has a closed operational state) is applied to the electrical node 390. Alternately, when the microcontroller 496 generates a second control signal (e.g., ground voltage level) that is received by the high voltage FET switch 200, the high voltage FET switch 200 transitions to an open operational state. In an exemplary embodiment, the second control signal applied to the high voltage FET switch 200 can be a ground voltage level.

Referring to FIGS. 1 and 2, the DC-DC voltage converter control circuit 204 can convert a DC voltage received at the high voltage terminal 390 to another DC voltage that is output at the low voltage terminal 392 during buck mode operation. Alternately, the DC-DC voltage converter control circuit 204 can convert a DC voltage received at the low voltage terminal 392 to another DC voltage that is output at the high voltage terminal 390 during boost mode operation. The DC-DC voltage converter control circuit 204 has a high side FET IC 380, a low side FET IC 382, a buck mode IC 384, a high voltage terminal 390, a low-voltage terminal 392, an input control terminal 394, a ground terminal 396, a ground terminal 398, nodes 400, 402, 404, and a resistor 406.

The high side FET IC 380 includes FET switches 430, 432, 434 therein whose operational state (e.g., closed operational state or open operational state) is controlled by control voltages received by the FET switches 430, 432, 434 from the buck mode IC 384. In an exemplary embodiment, the FET switches 430, 432, 434 are electrically coupled at a first end to the high voltage terminal 390.

The FET switch 430 is electrically coupled between the high voltage terminal 390 and the node 400, and is further electrically coupled in series with the FET switch 460 of the low side FET IC 382.

The FET switch 432 is electrically coupled between the high voltage terminal 390 and the node 402, and is further electrically coupled in series with the FET switch 462 of the low side FET IC 382.

The FET switch 434 is electrically coupled between the high voltage terminal 390 and the node 404, and further electrically coupled in series with the FET switch 464 of the low side FET IC 382.

The low side FET IC 382 includes FET switches 460, 462, 464 therein whose operational state (e.g., closed operational state or open operational state) is controlled by control voltages received by the FET switches 460, 462, 464 from the buck mode IC 384. In an exemplary embodiment, the FET switches 460, 462, 464 are electrically coupled in series with the FET switches 430, 432, 434, respectively. The FET switches 460, 462, 464 are further electrically coupled to the resistor 406 which is further electrically coupled to electrical ground.

The buck mode IC 384 generates control signals to control the operation of the FET switches 430, 432, 434 of the high side FET IC 380 and the FET switches 460, 462, 464 of the low side FET IC 382 during buck mode operation of the DC-DC converter circuit 204. In particular, a duty cycle of control signals applied to the FET switches 430, 432, 434 and the FET switches 460, 462, 464 is proportional to a voltage level of the DC-DC voltage converter control voltage (CTRL) received at the input control terminal 394. For example, when the voltage level of the DC-DC voltage converter control voltage (CTRL) is increased, a duty cycle of the control signals applied to the FET switches is also increased in a proportional manner. Alternately, when the voltage level of the DC-DC voltage converter control voltage (CTRL) is decreased, a duty cycle of the control signals applied to the FET switches is also decreased in a proportional manner.

Referring to FIG. 1, the inductor 206 is electrically coupled to and between the low voltage terminal 392 of the DC-DC voltage converter circuit 204 and a current sensor 480 utilizing the electrical lines 222, 224. The capacitor 208 is electrically coupled to and between the electrical line 226 and the ground terminal 398 of the DC-DC voltage converter circuit 204.

The low voltage FET switch 210 is electrically coupled between the current sensor 480 and the low voltage FET switch 212 utilizing the electrical lines 226, 227. The low voltage FET switch 212 is electrically coupled between the low voltage FET switch 210 and the electrical mode 94. When the microcontroller 496 generates first and second control signals that are received by the low voltage FET switches 210, 212, respectively, the low voltage FET switches 210, 212 each transition to a closed operational state and electrically couple the inductor 206 to both the battery 70 and the electrical load 76. Alternately, when the microcontroller 496 generates third and fourth control signals (e.g., third and fourth ground voltage levels) that are received by the low voltage FET switches 210, 212, respectively, the low voltage FET switches 210, 212 each transition to an open operational state and electrically de-couple the inductor 206 from the battery 70 and the electrical load 76.

Before explaining the control system 214 for controlling the DC-DC voltage converter circuit 204, some additional structure of the vehicle 10 will now be described for purposes of understanding.

The battery 70 includes a positive terminal 660 and a negative terminal 662. In an exemplary embodiment, the battery 70 generates 12 Vdc between the positive terminal 660 and the negative terminal 662. The positive terminal 660 is electrically coupled to the electrical node 94. The negative terminal 662 is electrically coupled to the electrical node 96 and the ground terminal 398.

The resistors 72, 74 are electrically coupled in series with the one another, and are electrically coupled in parallel to the battery 70 and to the electrical load 76. In particular, the resister 72 is electrically coupled between the electrical node 94 and the electrical node 95. Further, the resistor 74 is electrically coupled between the electrical node 95 and the electrical node 96. A voltage (LV_SENSE) at the electrical node 95 is proportional to the voltage applied to the battery 70 and to the electrical load 76 and is received by the output voltage controller 482 via an electrical line 500.

The electrical load 76 is electrically coupled to and between the electrical node 94 and electrical node 96. In an exemplary embodiment, the electrical load 76 includes an inverter that is electrically coupled to an electric motor.

Referring to FIGS. 1 and 3, the control system 214 for controlling the DC-DC voltage converter circuit 204 will be explained. The control system 214 includes a current sensor 480, an output voltage controller 482, an output current controller 484, a diode 486, an input voltage controller 488, a diode 490, voltage drivers 492, 494, a microcontroller 496, and electrical lines 500, 502, 504, 506, 508, 510, 512, 514, 516, 518, 520, 522, 524.

The current sensor 480 is provided to generate the current monitoring voltage (I_SENSE) which has a voltage level proportional to an amount or a magnitude of electrical current flowing from the low voltage terminal 392 of the DC-DC voltage converter circuit 204 and through the inductor 206. In particular, the current sensor 480 is electrically coupled to the low voltage terminal 392 of the DC-DC voltage converter circuit 202 utilizing the electrical lines 222, 224 and the inductor 206.

The output voltage controller 482 is provided to maintain an output voltage from the DC-DC voltage converter circuit 204 below a maximum desired output voltage level to prevent the battery 70 from being degraded or the electrical load 76 from being degraded. In particular, the output voltage controller 482 adjusts the DC-DC voltage converter control voltage (CTRL), which the buck mode IC 384 utilizes to proportionally adjust a duty cycle of the FET switches in the high side FET IC 380 and the FET switches within the low side FET IC 382 to prevent the low voltage (LV_SENSE) from being greater than an output reference voltage (LV_REF_BUCK).

The output voltage controller 482 includes an operational amplifier 550, a resistor 552, and capacitors 554, 556. The operational amplifier 550 includes a non-inverting input terminal, an inverting input terminal, and an output terminal.

The inverting input terminal of the operational amplifier 550 corresponds to a first input node of the output voltage controller 482 that receives the low voltage (LV_SENSE) via the electrical line 500. In particular, the inverting input terminal of the operational amplifier 550 is electrically coupled to the low voltage terminal of the DC-DC voltage converter circuit 392 via the resistor 72, the switches 210, 212, the current sensor 480, and the inductor 206, and receives the low voltage (LV_SENSE) from a low voltage source (e.g., resistors 72, 74 electrically coupled in parallel to the battery 70) via the electrical line 500.

The non-inverting input terminal of the operational amplifier 550 corresponds to a second input node of the output voltage controller 482 that receives the output reference voltage (LV_REF_BUCK) via the electrical line 502 from the microcontroller 496. The non-inverting input terminal of the operational amplifier 550 is electrically coupled to the microcontroller 520 via the electrical line 502.

The output terminal of the operational amplifier 550 corresponds to the output node of the output voltage controller 482 and is electrically coupled to the input control terminal 394 of the DC-DC voltage converter circuit 204 via the electrical line 504.

The resistor 552 and the capacitor 556 are electrically coupled in series with one another and between the electrical line 504 and electrical ground. The resistor 552 and the capacitor 556 are further electrically coupled between the output terminal of the operational amplifier 550 and electrical ground. The capacitor 554 is electrically coupled in parallel to the series-combination of the resistor 552 and the capacitor 556.

During operation, the operational amplifier 550 outputs the DC-DC voltage converter control voltage (CTRL) on the output terminal thereof to increase a switching duty cycle of the FET switches within the DC-DC voltage converter circuit 204 when the low voltage (LV_SENSE) is less than the output reference voltage (LV_REF_BUCK). It is noted that by increasing the duty cycle of the FET switches within the DC-DC voltage converter circuit 204, the low voltage (LV_SENSE) will be increased toward the output reference voltage (LV_REF_BUCK).

The output current controller 484 is provided to maintain an output current flowing from the DC-DC voltage converter circuit 204 and through the current sensor 480 below a maximum desired output current level to prevent the battery 70 from being degraded or the electrical load 76 from being degraded. In particular, the output current controller 484 can decrease the DC-DC voltage converter control voltage (CTRL), which induces the buck mode IC 384 to proportionally decrease a duty cycle of the FET switches in the high side FET IC 380 and the FET switches within the low side FET IC 382 when a current monitoring voltage (I_SENSE) is greater than an output reference current signal (I_REF_BUCK).

The output current controller 484 includes an operational amplifier 600, resistors 602, 604, and a capacitor 606. The operational amplifier 600 includes a non-inverting input terminal, an inverting input terminal, and an output terminal.

The inverting input terminal of the operational amplifier 600 corresponds to an input node of the output current controller 484 that receives the current monitoring voltage (I_SENSE) from the current sensor 480 via the electrical line 508.

The non-inverting input terminal of the operational amplifier 600 corresponds to an input node of the output current controller 484 that receives the output reference current signal (I_REF_BUCK) via the electrical line 510 from the microcontroller 496.

The output terminal of the operational amplifier 600 corresponds to the output node of the output current controller 484 and is electrically coupled to the cathode of the diode 486 and outputs a signal C. The anode of the diode 486 is electrically coupled to the input control terminal 394 of the DC-DC voltage converter circuit 204.

The resistor 602 is electrically coupled between and to the electrical line 508 and the inverting terminal of the operational amplifier 600. The resistor 604 and the capacitor 606 are electrically coupled in series with one another and between the inverting terminal of the operational amplifier 600 and the output terminal of the operational amplifier 600.

During operation, in an output current control mode, the output current controller 484 conducts current through the diode 486 to reduce the DC-DC voltage converter control voltage (CTRL) (generated by the output voltage controller 482) at the input control terminal 394 of the DC-DC voltage converter circuit 204 when the current monitoring voltage (I_SENSE) is greater than the output reference current signal (LREF_BUCK) to reduce the switching duty cycle of the FETS within the DC-DC voltage converter circuit 204 which will reduce the current flowing through the inductor 206 from the DC-DC voltage converter circuit 204.

The input voltage controller 488 is provided to maintain an input voltage level applied to the DC-DC voltage converter circuit 204 below a maximum desired input voltage level. In particular, the input voltage controller 488 can decrease the DC-DC voltage converter control voltage (CTRL), which induces the buck mode IC 384 to proportionally decrease a duty cycle of the FET switches in the high side FET IC 380 and the FET switches within the low side FET IC 382 when a high voltage (HV_SENSE) is less than an input reference voltage (HV_REF_BUCK), which will result in the DC-DC voltage converter control voltage (CTRL) decreasing, and the high voltage (HV_SENSE) increasing toward the input reference voltage (HV_REF_BUCK).

The input voltage controller 488 includes an operational amplifier 640, resistors 642, 644, and a capacitor 646. The operational amplifier 640 includes a non-inverting input terminal, an inverting input terminal, and an output terminal.

The inverting input terminal of the operational amplifier 640 corresponds to an input node of the input voltage controller 488 that receives the input reference voltage (HV_REF_BUCK) from the microcontroller 496 via the electrical line 512.

The non-inverting input terminal of the operational amplifier 640 corresponds to an input node of the input voltage controller 488 that receives the high voltage (HV_SENSE) via the electrical line 524 from a high voltage source (e.g., active rectifier or battery 40).

The output terminal of the operational amplifier 640 corresponds to the output node of the input voltage controller 488 and is electrically coupled to the cathode of the diode 490 and outputs a signal B. The anode of the diode 490 is electrically coupled to the input control terminal 394 of the DC-DC voltage converter circuit 204.

The resistor 642 is electrically coupled between and to the electrical line 512 and the inverting terminal of the operational amplifier 640. The resistor 644 and the capacitor 646 are electrically coupled in series with one another and between the inverting terminal of the operational amplifier 640 and the output terminal of the operational amplifier 640.

During operation, in the input voltage control mode, the input voltage controller 488 conducts current through the diode 490 to reduce the DC-DC voltage converter control voltage (CTRL) (generated by the output voltage controller 482) at the input control terminal 394 of the DC-DC voltage converter circuit 204 when the high voltage (HV_SENSE) is less than the input reference voltage (HV_REF_BUCK), which will result in the high voltage (HV_SENSE) increasing toward the input reference voltage (HV_REF_BUCK).

Referring to FIG. 1, the voltage driver 492 is electrically coupled to and between the microcontroller 496 and a first end of the contactor coil 160. The voltage driver 494 is electrically coupled to and between the microcontroller and a second end of the contactor coil 160. When the microcontroller 496 generates first and second control signals that are received by the voltage drivers 492, 494, the contactor coil 160 is energized which causes the contact 162 to transition to a closed operational state. Alternately, when the microcontroller 496 generates third and fourth control signals (e.g., ground voltage level signals) that are received by the voltage drivers 492, 494, the contactor coil 160 is de-energized which causes the contact 162 to transition to an open operational state.

The microcontroller 496 is operably coupled to the output voltage controller 482, the output current controller 484, the input voltage controller 488, the communication bus 78, the voltage drivers 492, 494, the high voltage switch 200, and the low voltage switches 210, 212. The microcontroller 496 includes a microprocessor 670 and a memory device 672. The memory device 672 stores data and software programs utilized by the microprocessor 670 for implementing the operational steps associated with the microcontroller 496. The microcontroller 496 operably communicates with the vehicle controller 80 utilizing the communication bus 80. In particular, the vehicle controller 80 can send messages to the microcontroller 496 indicating the voltage levels for (HV_REF_BUCK), (I_REF_BUCK), (LV_REF_BUCK), and indicating the control mode that the DC-DC voltage converter 62 will be operated in.

Figure 4:
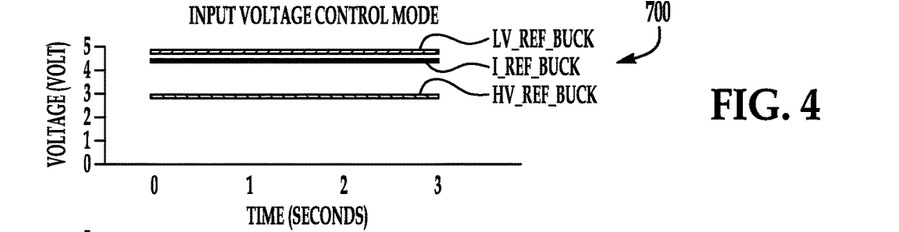
FIG. 4 is a graph of an output reference voltage (LV_REF_BUCK), an output current signal (I_REF_BUCK), and an input reference voltage (HV_REF_BUCK) utilized by the control system of FIG. 3 during an input voltage control mode.
Figure 5:
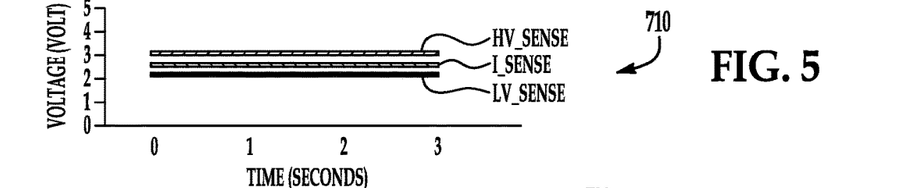
FIG. 5 is a graph of a high voltage (HV_SENSE), a current monitoring voltage (I_SENSE), and a low voltage (LV_SENSE) utilized by the control system of FIG. 3 during the input voltage control mode.
Figure 6:
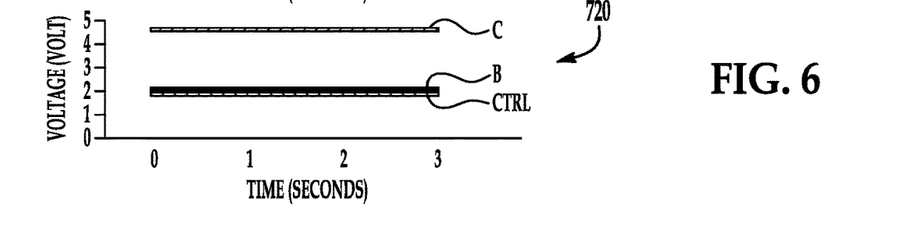
FIG. 6 is a graph of an output voltage (C) of the output current controller of FIG. 3, an output voltage (B) of the input voltage controller of FIG. 3, and a DC-DC voltage converter control voltage (CTRL) utilized by the control system of FIG. 3 during the input voltage control mode.

Referring to FIGS. 4-6, the graphs 700, 710, 720 illustrate exemplary signals when the DC-DC voltage converter 62 is operating in an input voltage control mode during buck mode operation. In particular, the graph 700 illustrates the following exemplary signals: (LV_REF_BUCK), (I_REF_BUCK), and HV_REF_BUCK). The graph 710 illustrates the following exemplary signals: (HV_SENSE), (I_SENSE), and (LV_SENSE). Further, the graph 720 illustrates exemplary signals: (C), (B), and (CTRL).

Figure 7:
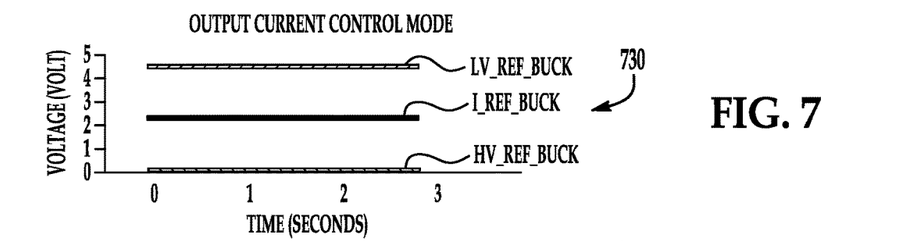
FIG. 7 is a graph of the output reference voltage (LV_REF_BUCK), the output current signal (I_REF_BUCK), and the input reference voltage (HV_REF_BUCK) utilized by the control system of FIG. 3 during an output current control mode.
Figure 8:
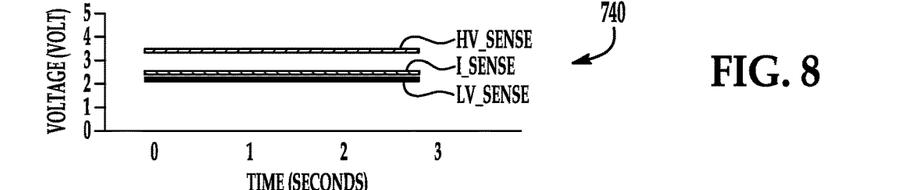
FIG. 8 is a graph of the high voltage (HV_SENSE), the current monitoring voltage (I_SENSE), and the low voltage (LV_SENSE) utilized by the control system of FIG. 3 during the output current control mode.
Figure 9:
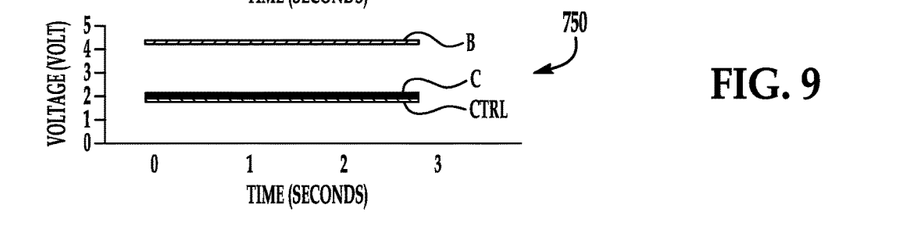
FIG. 9 is a graph of the output voltage (C) of the output current controller of FIG. 3, the output voltage (B) of the input voltage controller of FIG. 3, and the DC-DC voltage converter control voltage (CTRL) utilized by the control system of FIG. 3 during the output current control mode.

Referring to FIGS. 7-9, the graphs 730, 740, 750 illustrate exemplary signals when the DC-DC voltage converter 62 is operating in an output current control mode during buck mode operation. In particular, the graph 730 illustrates the following exemplary signals: (LV_REF_BUCK), (I_REF_BUCK), and HV_REF_BUCK). The graph 740 illustrates the following exemplary signals: (HV_SENSE), (I_SENSE), and (LV_SENSE). Further, the graph 750 illustrates exemplary signals: (C), (B), and (CTRL).

Figure 10:
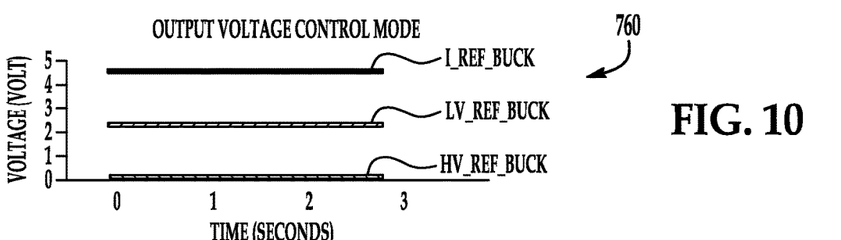
FIG. 10 is a graph of the output reference voltage (LV_REF_BUCK), the output current signal (I_REF_BUCK), and the input reference voltage (HV_REF_BUCK) utilized by the control system of FIG. 3 during an output voltage control mode.
Figure 11:
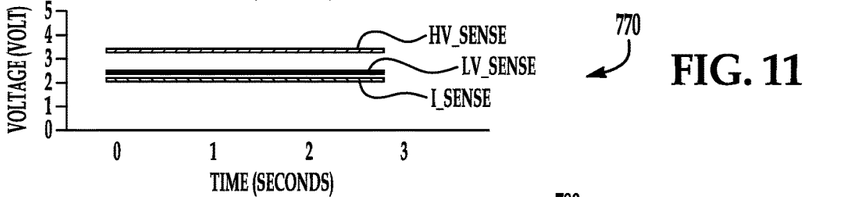
FIG. 11 is a graph of the high voltage (HV_SENSE), the current monitoring voltage (I_SENSE), and the low voltage (LV_SENSE) utilized by the control system of FIG. 3 during the output voltage control mode.
Figure 12:
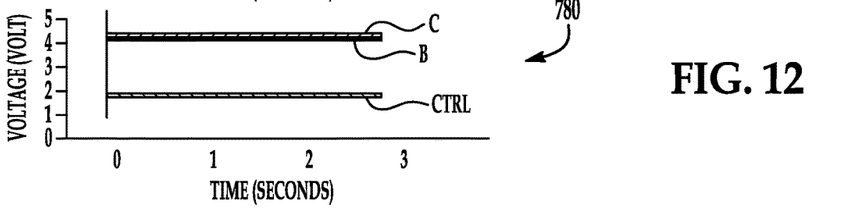
FIG. 12 is a graph of the output voltage (C) of the output current controller of FIG. 3, the output voltage (B) of the input voltage controller of FIG. 3, and the DC-DC voltage converter control voltage (CTRL) utilized by the control system of FIG. 3 during the output voltage control mode.

Referring to FIGS. 10-12, the graphs 760, 770, 780 illustrate exemplary signals when the DC-DC voltage converter 62 is operating in an output voltage control mode during buck mode operation. In particular, the graph 760 illustrates the following exemplary signals: (LV_REF_BUCK), (I_REF_BUCK), and HV_REF_BUCK). The graph 770 illustrates the following exemplary signals: (HV_SENSE), (I_SENSE), and (LV_SENSE). Further, the graph 780 illustrates exemplary signals: (C), (B), and (CTRL).

Referring to FIGS. 1 and 13-17, a flowchart of a method for controlling the DC-DC voltage converter circuit 204 will be explained.

Figure 13:
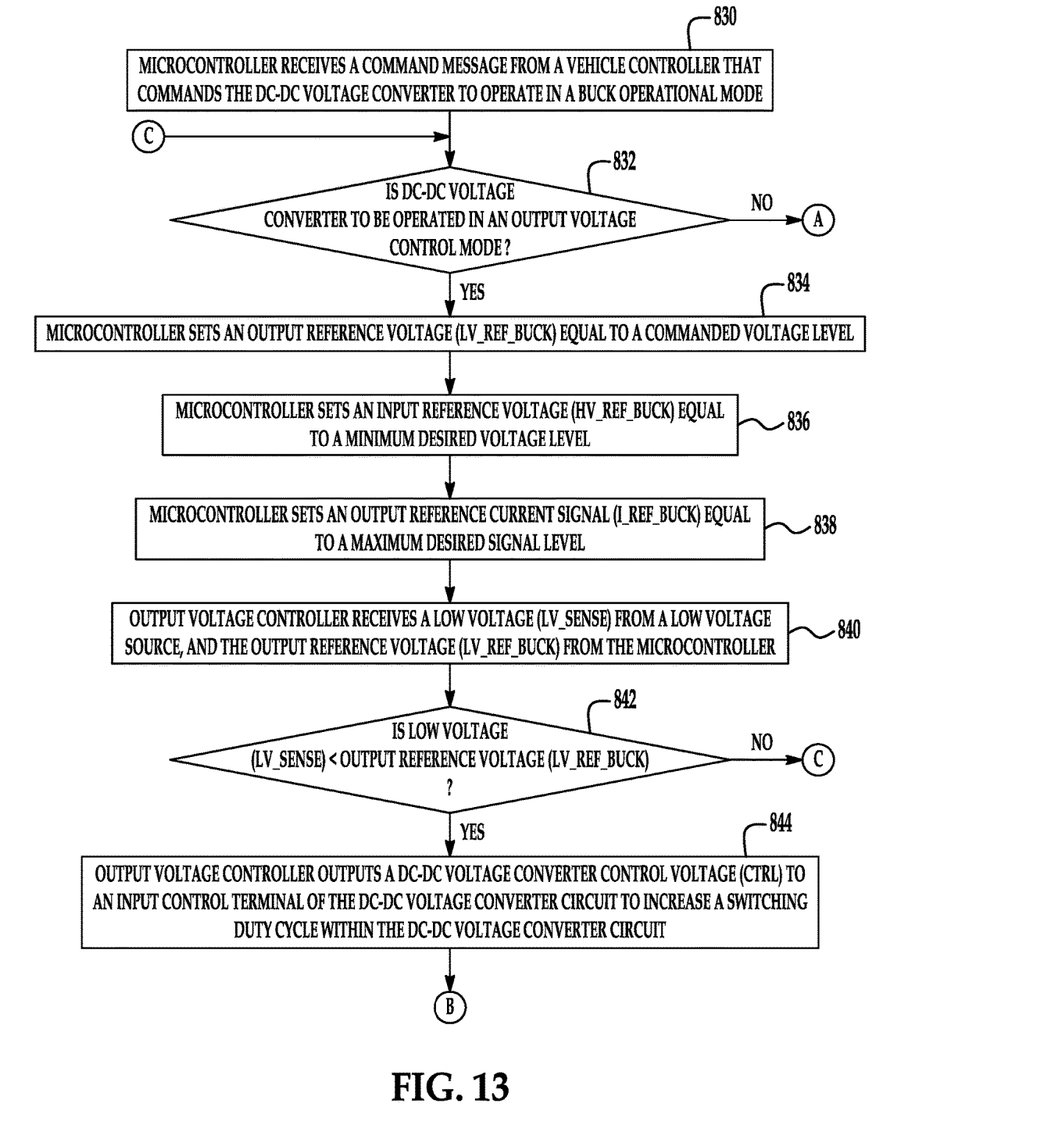
FIGS. 13-17 are flowcharts of a method for controlling a DC-DC voltage converter circuit in accordance with another exemplary environment.

At step 830, the microcontroller 496 receives a command message from the vehicle controller 80 that commands the DC-DC voltage converter 62 to operate in a buck operational mode. After step 830, the method advances to step 832.

At step 832, the microcontroller 496 makes a determination as to whether the DC-DC voltage converter 62 is to be operated in an output voltage control mode. If the value of step 832 equals "yes", the method advances to step 834. Otherwise, the method advances to step 858.

At step 834, the microcontroller 496 sets an output reference voltage (LV_REF_BUCK) equal to a commanded voltage level. After step 834, the method advances to step 836.

At step 836, the microcontroller 496 sets an input reference voltage (HV_REF_BUCK) equal to a minimum desired voltage level. After step 836, the method advances to step 838.

At step 838, the microcontroller 496 sets an output reference current signal (I_REF_BUCK) equal to a maximum desired signal level. After step 838, the method advances to step 840.

At step 840, the output voltage controller 482 receives a low voltage (LV_SENSE) from a low voltage source, and the output reference voltage (LV_REF_BUCK) from the microcontroller 496. After step 840, the method advances to step 842.

At step 842, the output voltage controller 482 makes a determination as to whether the low voltage (LV_SENSE) is less than an output reference voltage (LV_REF_BUCK). If the value of step 842 equals "yes", the method advances to step 844. Otherwise, the method returns to step 832.

At step 844, the output voltage controller 482 outputs a DC-DC voltage converter control voltage (CTRL) to an input control terminal 394 of the DC-DC voltage converter circuit 204 to increase a switching duty cycle within the DC-DC voltage converter circuit 204. After step 844, the method advances step 850.

Figure 14:
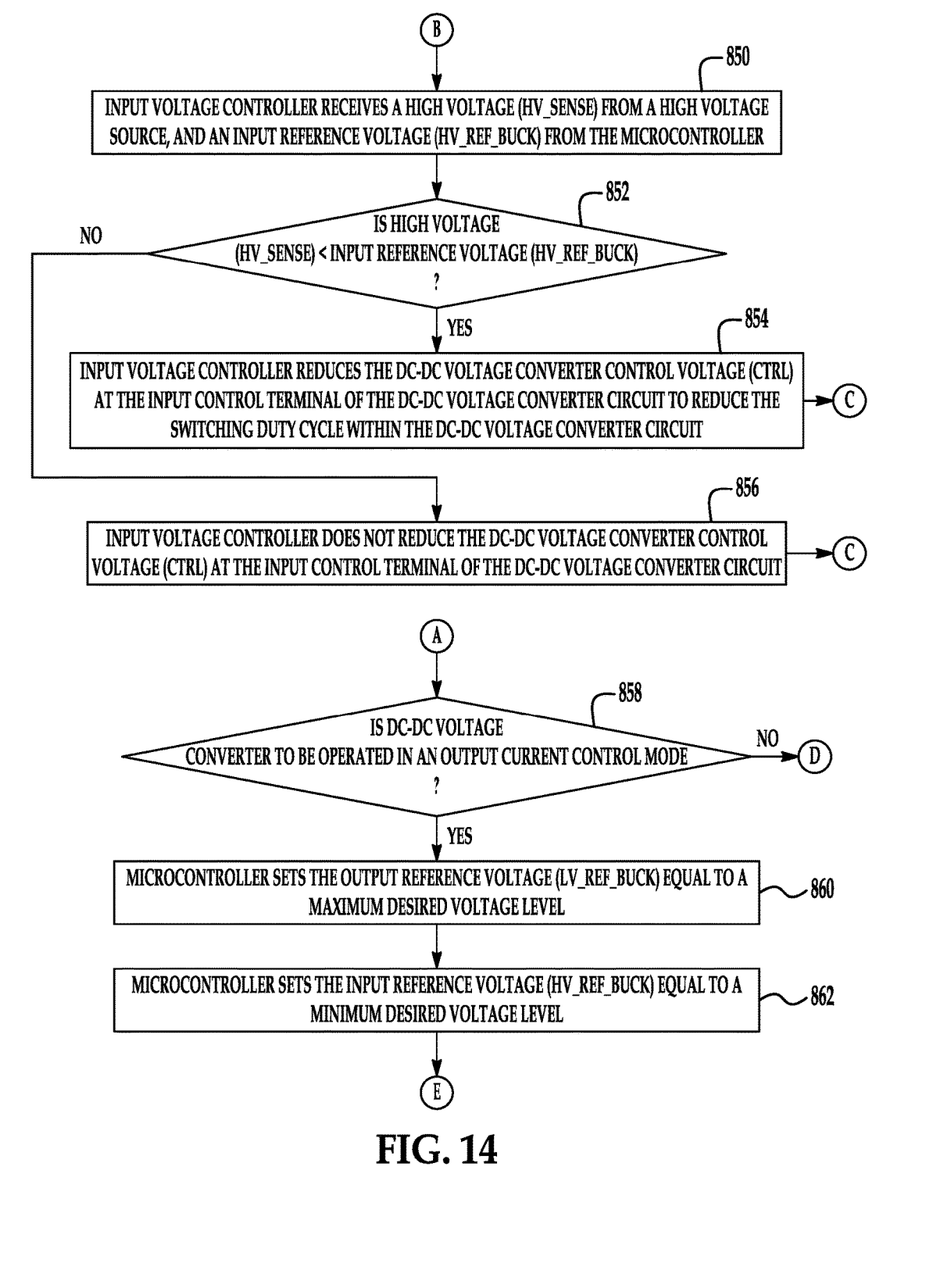

At step 850, the input voltage controller 488 receives a high voltage (HV_SENSE) from a high voltage source, and an input reference voltage (HV_REF_BUCK) from the microcontroller 496. After step 850, the method advances to step 852.

At step 852, the input voltage controller 488 makes a determination as to whether the high voltage (HV_SENSE) is less than an input reference voltage (HV_REF_BUCK). If the value of step 852 equals "yes", the method advances to step 854. Otherwise, the method advances to step 856.

At step 854, the input voltage controller 488 reduces the DC-DC voltage converter control voltage (CTRL) at the input control terminal 394 of the DC-DC voltage converter circuit 204 to reduce the switching duty cycle within the DC-DC voltage converter circuit 204. After step 854, the method returns to step 832.

Referring again to step 852, if the value of step 852 equals "no", the method advances to step 856. At step 856, the input voltage controller 488 does not reduce the DC-DC voltage converter control voltage (CTRL) at the input control terminal 394 of the DC-DC voltage converter circuit 204. After step 856, the method returns to step 832.

Referring again to step 832, if the value of step 832 equals "no", the method advances to step 858.

Figure 15:
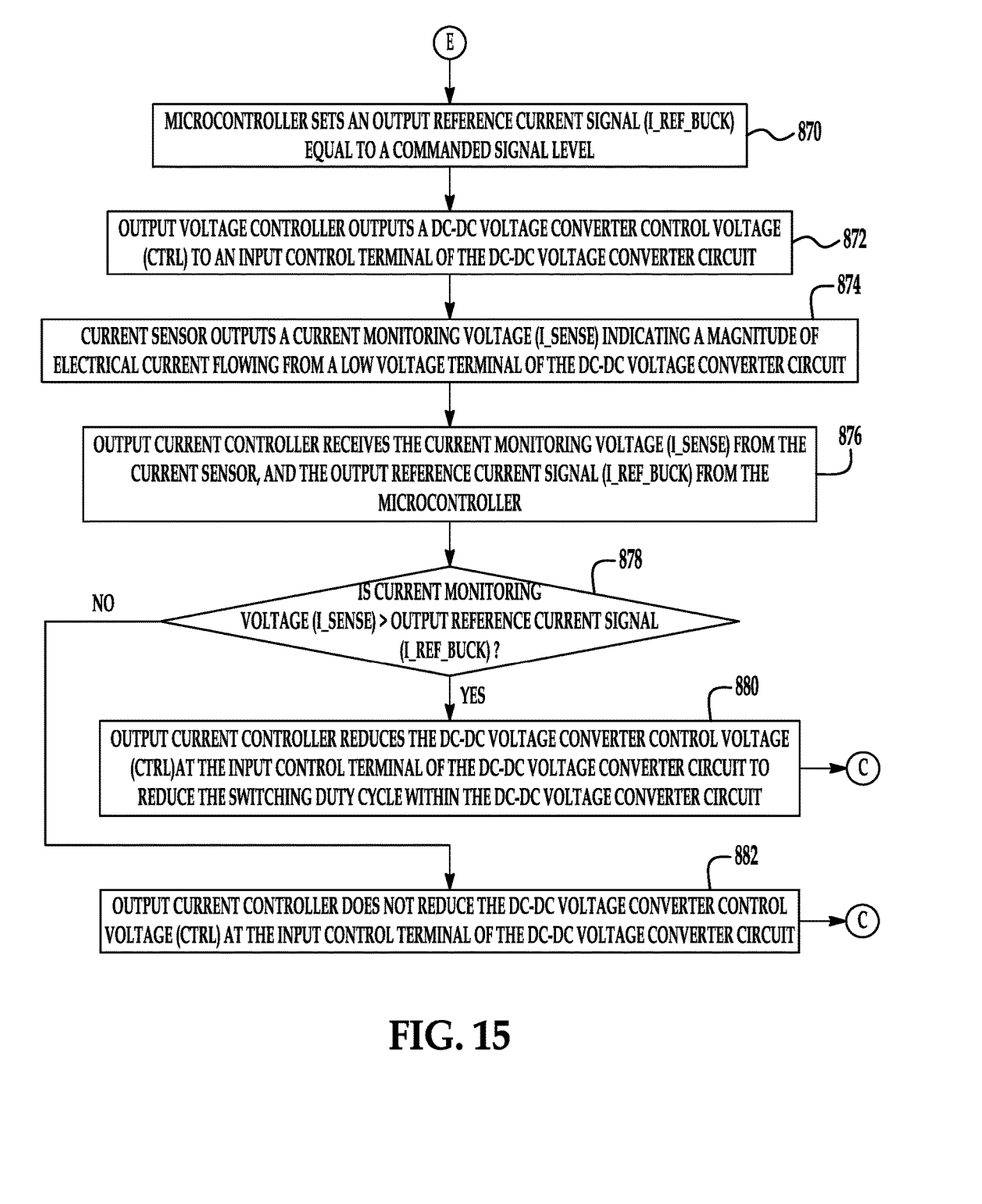

At step 858, the microcontroller 496 makes a determination as to whether the DC-DC voltage converter 62 is to be operated in an output current control mode. If the value of step 858 equals "yes", the method advances to step 860. Otherwise, the method advances to step 890.

At step 860, the microcontroller 496 sets the output reference voltage (LV_REF_BUCK) equal to a maximum desired voltage level. After step 860, the method advances to step 862.

At step 862, the microcontroller 496 sets the input reference voltage (HV_REF_BUCK) equal to a minimum desired voltage level. After step 862, the method advances to step 870.

At step 870, the microcontroller 496 sets the output reference current signal (I_REF_BUCK) equal to a commanded signal level. After step 870, the method advances to step 872.

At step 872, the output voltage controller 482 outputs a DC-DC voltage converter control voltage (CTRL) to the input control terminal 394 of the DC-DC voltage converter circuit 204. After step 872, the method advances to step 874.

At step 874, the current sensor 480 outputs a current monitoring voltage (I_SENSE) indicating a magnitude of electrical current flowing from a low voltage terminal 392 of the DC-DC voltage converter circuit 204. After step 874, the method advances to step 876.

At step 876, the output current controller 484 receives the current monitoring voltage (I_SENSE) from the current sensor 480, and the output reference current signal (I_REF_BUCK) from the microcontroller 496. After step 876, the method advances to step 878.

Figure 16:
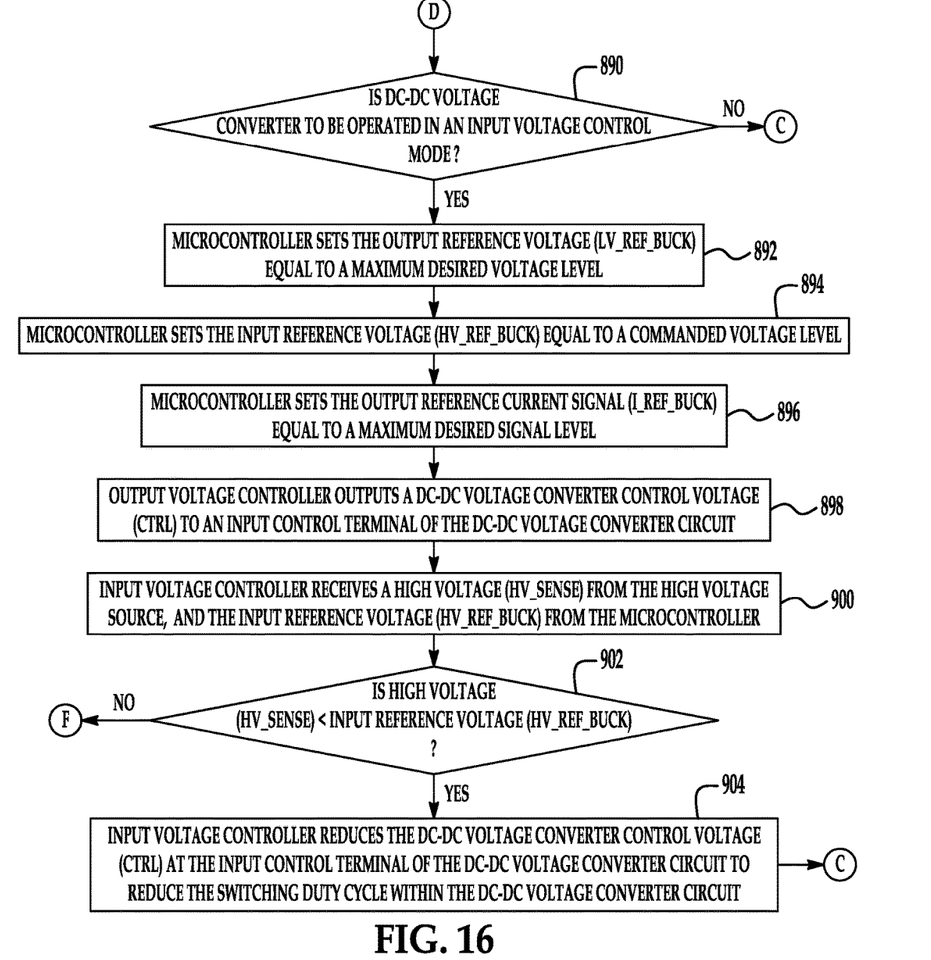

At step 878, the output current controller 484 makes a determination as to whether the current monitoring voltage (I_SENSE) is greater than an output reference current signal (I_REF_BUCK). If the value of step 878 equals "yes", the method advances to step 880. Otherwise, the method advances to step 882.

At step 880, the output current controller 484 reduces the DC-DC voltage converter control voltage (CTRL) at the input control terminal 394 of the DC-DC voltage converter circuit 204 to reduce the switching duty cycle within the DC-DC voltage converter circuit 204. After step 880, the method returns to step 832.

Referring again to step 878, if the value of step 878 equals "no", the method advances to step 882. At step 882, the output current controller 484 does not reduce the DC-DC voltage converter control voltage (CTRL) at the input control terminal 394 of the DC-DC voltage converter circuit 204. After step 882, the method returns to step 832.

Referring again to step 858, if the value of step 858 equals "no", the method advances to step 890. At step 890, the microcontroller 496 makes a determination as to whether the DC-DC voltage converter 62 is to be operated in an input voltage control mode. If the value of step 890 equals "yes", the method advances to step 892. Otherwise, the method returns to step 832.

At step 892, the microcontroller 496 sets the output reference voltage (LV_REF_BUCK) equal to a maximum desired voltage level. After step 892, the method advances step 894.

At step 894, the microcontroller 496 sets the input reference voltage (HV_REF_BUCK) equal to a commanded voltage level. After step 894, the method advances to step 896.

Figure 17:
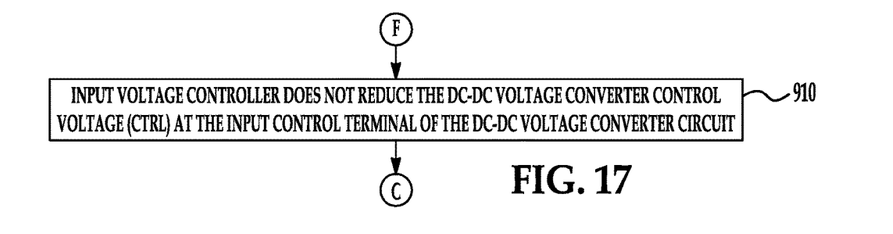

At step 896, the microcontroller 496 sets the output reference current signal (I_REF_BUCK) equal to a maximum desired signal level. After step 896, the method advances to step 898.

At step 898, the output voltage controller 482 outputs a DC-DC voltage converter control voltage (CTRL) to an input control terminal 394 of the DC-DC voltage converter circuit 204. After step 898, the method advances to step 900.

At step 900, the input voltage controller 488 receives a high voltage (HV_SENSE) from the high voltage source, and the input reference voltage (HV_REF_BUCK) from the microcontroller 496. After step 900, the method advances step 902.

At step 902, the input voltage controller 488 makes a determination as to whether the high voltage (HV_SENSE) is less than the input reference voltage (HV_REF_BUCK). If the value of step 902 equals "yes", the method advances to step 904. Otherwise, the method advances to step 910.

At step 904, the input voltage controller 488 reduces the DC-DC voltage converter control voltage (CTRL) at the input control terminal 394 of the DC-DC voltage converter circuit 204 to reduce the switching duty cycle within the DC-DC voltage converter circuit 204. After step 904, the method returns to step 832.

Referring again to step 902, if the value of step 902 equals "no", the method advances to step 910. At step 910, the input voltage controller 488 does not reduce the DC-DC voltage converter control voltage (CTRL) at the input control terminal 394 of the DC-DC voltage converter circuit 204. After step 910, the method returns to step 832.

The control system for controlling the DC-DC voltage converter circuit provides a substantial advantage over other control systems. In particular, the control system utilizes an output voltage controller to maintain an output voltage within a desired voltage level range, and utilizes an output current controller to maintain an output current with the desired current level range, and utilizes an input voltage controller to maintain an input voltage with a desired voltage level range.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A control system for controlling a DC-DC voltage converter circuit, the DC-DC voltage converter circuit having a high voltage terminal, a low voltage terminal, an input control terminal; the high voltage terminal being electrically coupled to a high voltage source, the low voltage terminal being electrically coupled to a low voltage source, comprising:

an output voltage controller that is electrically coupled to the low voltage terminal and to the input control terminal of the DC-DC voltage converter circuit, the output voltage controller receiving a low voltage from the low voltage source, the output voltage controller outputting a DC-DC voltage converter control voltage to the input control terminal to increase a switching duty cycle within the DC-DC voltage converter circuit when the low voltage is less than an output reference voltage;

a first diode having a first cathode and a first anode; the first anode being electrically coupled to the input control terminal of the DC-DC voltage converter circuit; and an input voltage controller being electrically coupled to the high voltage terminal of the DC-DC voltage converter circuit and receiving a high voltage from the high voltage source; the input voltage controller further receiving an input reference voltage, the input voltage controller being further electrically coupled to the first cathode of the first diode, and the input voltage controller reducing the DC-DC voltage converter control voltage at the input control terminal of the DC-DC voltage converter circuit when the high voltage is less than the input reference voltage to reduce the switching duty cycle within the DC-DC voltage converter circuit.

2. The control system of claim 1, wherein:

the output voltage controller having first and second input nodes and an output node, the first input node of the output voltage controller being electrically coupled to the low voltage terminal of the DC-DC voltage converter circuit and receiving the low voltage from the low voltage source; the second input node of the output voltage controller being electrically coupled to a microcontroller and receiving the output reference voltage, the output node of the output voltage controller being electrically coupled to the input control terminal of the DC-DC voltage converter circuit, the output voltage controller outputting the DC-DC voltage converter control voltage on the output node thereof when the low voltage is less than the output reference voltage; and the input voltage controller having first and second input nodes and an output node, the first input node of the input voltage controller being electrically coupled to the high voltage terminal of the DC-DC voltage converter circuit and receiving the high voltage from the high voltage source; the second input node of the input voltage controller being electrically coupled to the microcontroller and receiving the input reference voltage, the output node of the input voltage controller being electrically coupled to the first cathode of the first diode.

3. The control system of claim 2, wherein the input voltage controller does not reduce the DC-DC voltage converter control voltage at the input control terminal of the DC-DC voltage converter circuit when the high voltage is greater than or equal to the input reference voltage to not reduce the switching duty cycle within the DC-DC voltage converter circuit.

4. The control system of claim 2, wherein the output reference voltage corresponds to a maximum desired output reference voltage.

5. The control system of claim 2, wherein the output voltage controller does not output the DC-DC voltage converter control voltage on the output node thereof when the low voltage is greater than or equal to the output reference voltage.

6. The control system of claim 2, wherein the output voltage controller includes:

an operational amplifier having a non-inverting input terminal, an inverting input terminal, and an output terminal; the inverting input terminal corresponding to the first input node of the output voltage controller that receives the low voltage; the non-inverting input terminal corresponding to the second input node of the output voltage controller that receives the output reference voltage; the output terminal of the operational amplifier corresponding to the output node of the output voltage controller; and a resistor and a capacitor electrically coupled in series with one another, the resistor and the capacitor being further electrically coupled between the output terminal of the operational amplifier and electrical ground.

7. The control system of claim 2, wherein the input voltage controller includes:

an operational amplifier having a non-inverting input terminal, an inverting input terminal, and an output terminal; the inverting input terminal being coupled to a first resistor that receives the high voltage; the non-inverting input terminal corresponding to the second input node of the input voltage controller that receives the input reference voltage; the output terminal of the operational amplifier corresponding to the output node of the input voltage controller; and a resistor and a capacitor electrically coupled in series with one another, the resistor and the capacitor being further electrically coupled between the inverting input terminal of the operational amplifier and the output terminal of the operational amplifier.

8. The control system of claim 7, wherein the input voltage controller conducts current through the first diode to electrical ground to reduce the DC-DC voltage converter control voltage at the input control terminal of the DC-DC voltage converter circuit when the high voltage is less than the input reference voltage to reduce the switching duty cycle within the DC-DC voltage converter circuit.

9. The control system of claim 1, further comprising:

a current sensor being electrically coupled to the low voltage terminal of the DC-DC voltage converter circuit, the current sensor outputting a current monitoring voltage indicating a magnitude of electrical current flowing from the low voltage terminal of the DC-DC voltage converter circuit;

a second diode having a second cathode and a second anode, the second anode being electrically coupled to the input control terminal of the DC-DC voltage converter circuit; and an output current controller being electrically coupled to the current sensor and receiving the current monitoring voltage; the output current controller further receiving an output reference current signal, the output current controller being electrically coupled to the second cathode of the second diode, the output current controller reducing the DC-DC voltage converter control voltage at the input control terminal of the DC-DC voltage converter circuit when the current monitoring voltage is greater than the output reference current signal to reduce the switching duty cycle within the DC-DC voltage converter circuit.

10. The control system of claim 9, wherein:

the output current controller having first and second input nodes and an output node, the first input node of the output current controller being electrically coupled to the current sensor and receiving the current monitoring voltage; the second input node of the output current controller being electrically coupled to a microcontroller and receiving the output reference current signal, the output node of the output current controller being electrically coupled to the second cathode of the second diode.

11. The control system of claim 10, wherein:

the output current controller not reducing the DC-DC voltage converter control voltage at the input control terminal of the DC-DC voltage converter circuit when the current monitoring voltage is less than or equal to the output reference current signal to not reduce the switching duty cycle within the DC-DC voltage converter circuit.

12. The control system of claim 10, wherein the output current controller includes:

an operational amplifier having a non-inverting input terminal, an inverting input terminal, and an output terminal; the inverting input terminal being coupled to a first resistor that is further electrically coupled to the current sensor; the non-inverting input terminal corresponding to the second input node of the output current controller; the non-inverting input terminal receiving the output reference current signal; the output terminal of the operational amplifier corresponding to the output node of the output current controller; and a resistor and a capacitor being electrically coupled in series with one another and between the inverting input terminal of the operational amplifier and the output terminal of the operational amplifier.

13. The control system of claim 12, wherein the output current controller conducts current through the second diode to reduce the DC-DC voltage converter control voltage at the input control terminal of the DC-DC voltage converter circuit when the current monitoring voltage is greater than the output reference current signal to reduce the switching duty cycle within the DC-DC voltage converter circuit.

* * * * *